(12) United States Patent
Dressel

(10) Patent No.: US 6,888,287 B2
(45) Date of Patent: May 3, 2005

(54) APPARATUS FOR SECUREMENT OF A WINDING ASSEMBLY

(75) Inventor: Gerhard Dressel, Schwarzenbruck (DE)

(73) Assignee: Siemens Aktiengesellschaft, München (DE)

( * ) Notice: Subject to any disclaimer, the term of this patent is extended or adjusted under 35 U.S.C. 154(b) by 162 days.

(21) Appl. No.: 10/067,695

(22) Filed: Feb. 5, 2002

(65) Prior Publication Data

US 2002/0117936 A1 Aug. 29, 2002

(30) Foreign Application Priority Data

Feb. 5, 2001 (DE) .......................................... 101 05 076

(51) Int. Cl.⁷ ................................................. H02K 3/46
(52) U.S. Cl. ...................... 310/260; 310/259; 310/254; 310/270
(58) Field of Search ................................ 310/259, 260, 310/270, 43, 194, 179, 154.17, 154.18, 154.19, 216; 29/596–598

(56) References Cited

U.S. PATENT DOCUMENTS

| | | | | |
|---|---|---|---|---|
| 2,711,008 A | * | 6/1955 | Smith ............................ | 29/596 |
| 3,777,197 A | | 12/1973 | Preston et al. ............... | 310/254 |
| 4,278,905 A | | 7/1981 | Chari et al. .................... | 310/52 |
| 4,709,180 A | * | 11/1987 | Denk ........................... | 310/179 |
| 4,852,245 A | * | 8/1989 | Denk ............................ | 29/596 |
| 4,912,353 A | * | 3/1990 | Kondo et al. ................ | 310/259 |
| 4,968,911 A | * | 11/1990 | Denk ............................ | 310/42 |
| 6,157,109 A | * | 12/2000 | Schiferl et al. .............. | 310/254 |
| 6,225,725 B1 | * | 5/2001 | Itoh et al. .................... | 310/254 |

FOREIGN PATENT DOCUMENTS

| | | | |
|---|---|---|---|
| CH | 587579 | * | 5/1977 |
| DE | 21 65 678 | | 7/1973 |
| DE | 23 00 149 B2 | | 7/1973 |
| DE | 26 55 399 C2 | | 7/1977 |
| DE | 30 03 483 | | 8/1980 |
| DE | 41 04 364 A | | 8/1991 |
| EP | 0 225 132 A1 | | 6/1987 |
| JP | 58 198138 A | | 11/1983 |
| JP | 05 219666 A | | 8/1993 |

* cited by examiner

Primary Examiner—Tran Nguyen
Assistant Examiner—Leda Pham
(74) Attorney, Agent, or Firm—Henry M. Feiereisen

(57) ABSTRACT

Apparatus for fastening a winding assembly disposed at least partially in an air gap between a stator yoke and a rotor of an electric machine, includes a main body made of electrically insulating non-magnetic material. The main body includes a cylindrical base and a plurality of axial webs projecting radially outwards from the base in a direction of the stator yoke for at least partial engagement in complementary recesses in the stator yoke.

18 Claims, 3 Drawing Sheets

APPARATUS FOR SECUREMENT OF A WINDING ASSEMBLY

CROSS-REFERENCES TO RELATED APPLICATIONS

This application claims the priority of German Patent Application Serial No. 101 05 076.3, filed Feb. 5, 2001, the subject matter of which is incorporated herein by reference.

BACKGROUND OF THE INVENTION

The present invention relates to a fastening apparatus for securement of a winding assembly disposed at least partially in the air gap between a stator yoke and a rotor of an electric machine. The present invention is also directed to an electric machine incorporating such a fastening apparatus as well as to a method for making an electric machine of this type.

The winding of an electric machine, i.e. the entirety of electric conductors including their insulation, is intended to generate magnetic fields, or electric power should be produced therein through magnetic fields. Distinctions are herby made between windings in slots of the stator yoke and in the air gap of the electric machine, so-called air-gap windings.

German Pat. No. 30 03 483 A discloses a fastening arrangement for securing an air-gap winding in the stator of an electric machine, with the arrangement including wedge-shaped spacer placed circumferentially between the individual winding bars of the air-gap winding. The winding bars and the spacers are wrapped around their outer periphery by a bandage to form a unitary structure which can be pushed into the bore of the stack of laminations. The spacers are toothed in a comb-like manner, whereby the teeth project out radially beyond the winding bars so that the bandages are wound into the spaces between neighboring teeth, and the teeth are held in form-fitting manner in respective recesses of a winding carrier constructed as a non-metallic hollow cylinder.

German Pat. No. DE 21 65 678 discloses a holding apparatus for a stator winding disposed in the air gap of a synchronous generator. The holding apparatus includes two hollow cylinders which accommodate the stator winding in-between and can be pushed as a unit into the bore of the stack of laminations. The outer hollow cylinder is made of non-magnetic steel and formed with inwardly open slots for receiving the stator winding. The inner hollow cylinder is made of plastic and pushed into a bore of the outer hollow cylinder to thereby cover the slots of the outer hollow cylinder.

The conventional prior art suffers shortcomings because the holding apparatus as well as the fastening arrangement for securing the winding in the air gap require many components which must be positioned appropriately and secured, thereby rendering the installation complex and time consuming.

It would therefore be desirable and advantageous to provide an improved fastening apparatus for securing a winding assembly in an air gap of an electric machine, which obviates prior art shortcomings and which can be installed in few steps, while yet realizing a reliable operation of the electric machine.

SUMMARY OF THE INVENTION

According to one aspect of the present invention, a fastening apparatus for securing a winding assembly disposed at least partially in an air gap between a stator yoke and a rotor of an electric machine, includes a main body made of electrically insulating non-magnetic material, whereby the main body includes a cylindrical base and a plurality of axial webs projecting radially outwards from the base in a direction of the stator yoke for at least partial engagement in complementary recesses in the stator yoke.

Suitably, the main body of the fastening apparatus is of single-piece configuration so as to significantly reduce the required number of components and to thereby simplify the installation as well as to significantly reduce the installation time, e.g., when manufacturing an electric machine. Moreover, a fastening apparatus according to the present invention can be stocked so that a respective fastening apparatus can be made immediately available when used for a particular axis height. Also, a fastening apparatus according to the present invention can already be pre-fabricated with winding assemblies.

The comb-like configuration of the webs in axial direction allows the accommodation of a bandage of the winding assembly in radially recessed sections of the webs. The bandage is able to absorb in particular radial forces during operation of, e.g., an electric machine. Bandages are generally known to the artisan and may be made from strands of fabric soaked with curable resin. Suitably, the thickness of the bandage corresponds to the height of the radially recessed webs.

According to another feature of the present invention, the radially recessed sections of the webs can be so configured as to allow an arrangement of the bandage in circumferential direction or in a helical configuration. As a consequence, depending on individual operating needs, e.g., an electric machine may be provided with particular and advantageous fixations of the winding assembly. Thus, in particular radial forces, which act upon the winding assembly, can be withstood by this fixation.

Although currently a single-piece configuration of the main body of the fastening apparatus for securing the winding assembly is generally preferred, it is certainly conceivable to provide the main body of the fastening apparatus according to the present invention also in the form of axial segments or circumferential segments. Such configurations may be suitable, when a greater fastening apparatus is involved, for use with, e.g. larger synchronous generators. Hereby, in particular when axial segments are involved, segments with varying height of the webs are provided which form a comb-like pattern of the axial webs across the entire axial length of the apparatus when lined up respectively.

According to another feature of the present invention, the segments are so constructed as to allow interconnection of the segments to thereby ensure a reliable operation of, e.g., an electric machine, even when the fastening apparatus has a segmental structure. Suitably, the segments may be interconnected by a material-based joint and/or form-fitting engagement. Examples include conventional dovetail connections and/or glued connections.

According to another feature of the present invention, the winding assembly may be secured in place by a bandage and/or through casting onto the main body. Thus, depending on the use, which may apply various force loads upon the winding assembly, the fixation of the winding assembly may be suited to the case at hand.

In particular for electric machines with superconductive rotor, it may be advantageous when the base of the main body has, in particular, a thermally closed surface in a direction toward the rotor. Introduction of heat across the air gap to the rotor is thereby effectively eliminated and optional cooling systems of the stator may be used to efficiently carry off heat generated in the winding assembly.

According to another feature of the present invention, the rotor-proximal surface may have a net-like structure, in particular when rotors are involved which are not superconductive. As a result, a certain cooling effect is established in the air gap as additional axial and radial cooling channels are realized in and around the winding assembly. The cooling action of the net-like structure of the rotor-facing surface can be further positively influenced when the webs are configured in a special and aligned manner.

Suitably, the net-like structure may be formed with toothed members at the crossing points of the axial and substantially circumferential webs. These toothed members engage complementary recesses in the stator yoke. As a consequence, the mechanical structure of the fastening apparatus becomes relatively stable.

According to another aspect of the present invention, an electric machine includes a stator yoke; a rotor, spaced from the stator yoke at formation of an air gap therebetween; and a fastening apparatus according to the present invention, wherein the stator yoke projects at least axially beyond winding overhangs located at an end face of the electric machine. By extending the stator yoke of the electric machine in axial direction to project over the winding overhangs and by wrapping the winding overhangs with a bandage at least in given axial sections, an even cross section of an essentially axial cooling system is realized between the stator yoke and the winding assembly fixed by the bandage. Therefore, the winding assembly is efficiently cooled, and heat transmission via the rotor-proximal cylinder surface is effectively eliminated.

According to still another aspect of the present invention, a method of making an electric machine with a fastening apparatus according to the present invention, includes the steps of stacking a plurality of predetermined laminations to form a stator yoke; radially placing a winding assembly into the fastening apparatus having a non-magnetic main body comprised of a cylindrical base and a plurality of axial webs projecting radially outwards from the base in a direction of the stator yoke for at least partial engagement in complementary recesses in the stator yoke; and inserting the fastening apparatus in axial direction into the stator yoke by fixing the radial webs in the stator yoke.

Almost any type of winding assembly, e.g. multi-layer windings etc., can be placed in the fastening apparatus according to the invention.

In order to realize a compression of the winding assembly upon the fastening apparatus and to provide a possible cooling channel between the stator yoke and the winding assembly with a greatest possible cross sectional area, the winding assembly is wrapped by a bandage across the comb-like webs. In this way, the cross section of the cooling channel is not constricted, i.e. the comb-like indentations of the webs correspond suitably to the thickness of the bandage. In order to additionally secure the winding assembly, it is also conceivable, to complement or to replace wrapping of the winding assembly with a bandage, by casting the winding assembly onto the fastening apparatus. The use of a bandage to wrap the winding overhangs also implements a compression of the winding overhangs so that the cross sectional area of the axial cooling channels remains effectively unchanged.

In order to avoid a further heat transfer in the direction of the rotor and also to provide an installation aid, it may be suitable to attach to the axial end of the fastening apparatus an electrically insulating cylindrical jacket of non-magnetic material in an area radially inwards of the winding overhangs.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
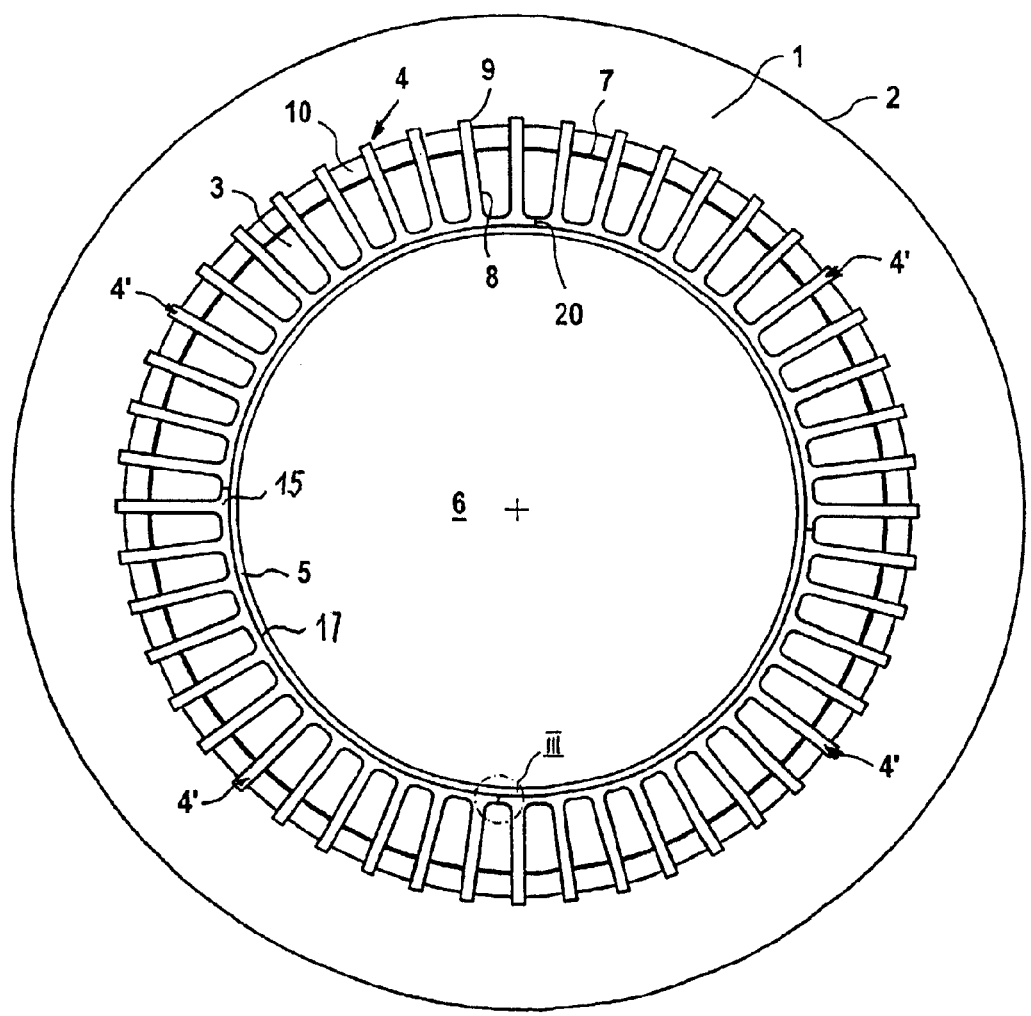
FIG. 1 is a principal cross sectional illustration of a stator of an electric machine, embodying a fastening apparatus according to the present invention.

Throughout all the Figures, same or corresponding elements are generally indicated by same reference numerals.

Figure 2:
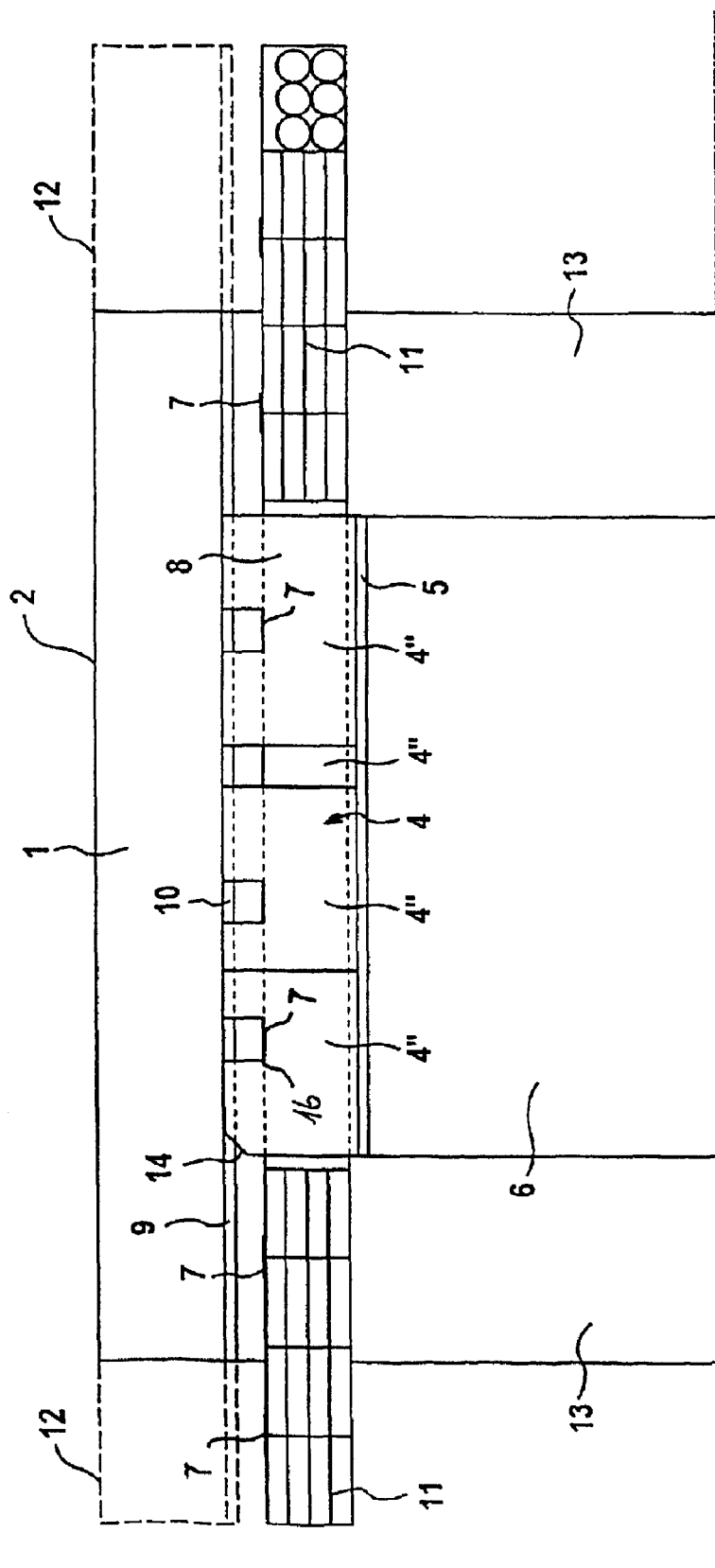
FIG. 2 is a principal longitudinal section of an electric machine, embodying a fastening apparatus according to the present invention.

Turning now to the drawing, and in particular to FIG. 1, there is shown a cross sectional illustration of an electric machine, including a yoke 1 of a stator 2 which surrounds a rotor 6 at formation of an air gap 5 therebetween. The electric machine has a winding, constructed as air-gap winding 3, which is held in the air gap 5 between the rotor 6 and the stator yoke 1 by a fastening apparatus according to the present invention, generally designated by reference numeral 4. The fastening apparatus 4 has a main body comprised of a cylindrical base 15 and a plurality of axial webs 8 which project radially outwards from the cylindrical base 15, as viewed in circumferential direction, whereby each of the webs 8 has a generally comb-like configuration through formation of depressions 16, as shown in FIG. 2.

A bandage 7 extends substantially in circumferential direction of the fastening apparatus 4 around the winding 3 to compress it and to secure the winding 3 upon the fastening apparatus 4. The bandage 7 is received in the comb-like depressions 16 of the axial webs 8.

The webs 8 of the fastening apparatus 4 have a star-shaped configuration, whereby their outer ends serve as toothed members to engage complementary, essentially axial recesses 9 of the yoke 1. As a consequence of the engagement of the webs 8 in the yoke 1, tangential forces of the air-gap winding 3 can be absorbed by the yoke 1, e.g. when an electrical error situation is encountered. Of course, the illustrated configuration of the webs 8 should be considered by way of example only, as the webs may also have a wedge-shaped configuration or a dove-tailed configuration.

Suitably, the axial webs net-like structure may be formed with toothed members at the crossing points of the axial webs and substantially circumferential webs. These toothed members engage complementary recesses in the stator yoke. As a consequence, the mechanical structure of the fastening apparatus becomes relatively stable.

Disposed between the yoke 1 and the air-gap winding 3, including the bandage 4 wrapped around the winding 3, are channels 10 which extend generally in axial direction and provided for implement a cooling system for the stator 2 of the electric machine. The channels 10 can thus be used for circulation of a gaseous fluid, e.g., air, and/or accommodation of tubular cooling ducts when realizing a cooling action with a liquid fluid.

Figure 3:
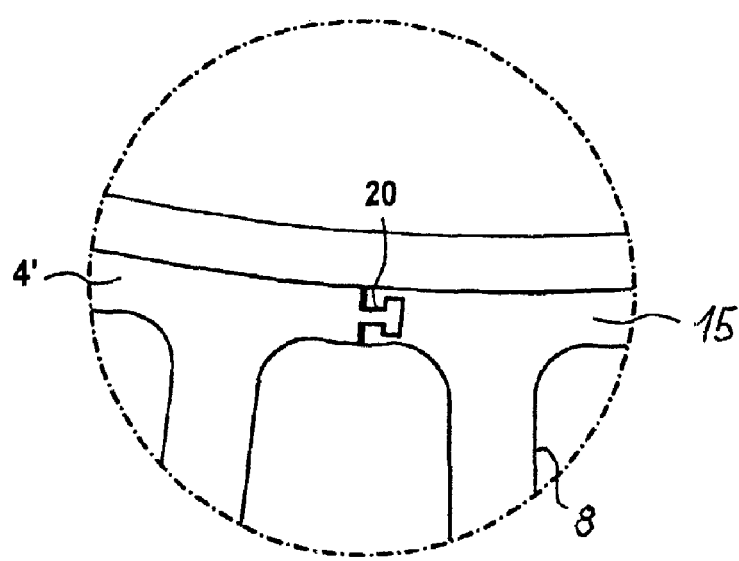
FIG. 3 is an enlarged detailed view of the area encircled III in FIG. 1.

The main body of the fastening apparatus 4 may be of single-piece configuration. As an alternative, FIG. 1 shows, by way of example, also the configuration of the main body in the form of segments 4' (here four segments 4') which are placed juxtaposed in circumferential direction and can be connected together at neighboring jointing edges 20 by means of an interlocking or form-fitting engagement, as shown by way of example in FIG. 3. Of course, other connection are conceivable as well, such as, e.g., a material-based joint.

Referring now to FIG. 2, there is shown a principal illustration of the electric machine, showing in detail the disposition of the individual components and the manner of operation of the fastening apparatus 4. Projecting axially beyond the main body of the fastening apparatus 4 are the winding overhangs 11 of the winding assembly which is constructed as air-gap winding 3. Optionally, bandages 7 may be wrapped around the winding overhangs 11 of the winding assembly as well and are self-compressing and secured in a same manner as the bandages 7 around the winding assembly inside the main body. In particular in the area of the main body of the fastening apparatus, the bandages 7 are arranged in the comb-shaped depressions 16 of the webs 8 so that the cross section of the axial cooling channels 10 remains unaffected and is not reduced. By axially distancing the individual bandages 7 upon the winding overhangs 11, different cooling channels 10 can be established in radial direction through the winding overhang 11.

Figure 4:
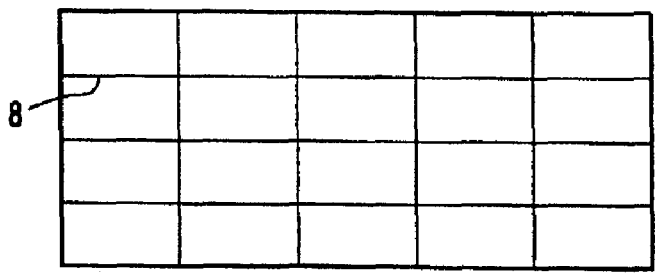
FIG. 4 is a schematic illustration of a configuration of a rotor-confronting surface of the fastening apparatus.
Figure 5:
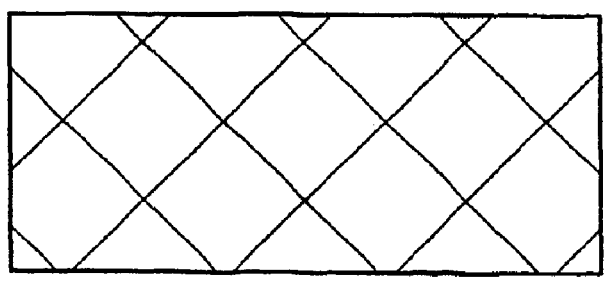
FIG. 5 is a schematic illustration of a variation of the configuration of the rotor-confronting surface of the fastening apparatus.

In order to improve the cooling action in particular in the area of the winding overhang 11, the yoke 1 is axially extended to project over the winding overhangs 11, as indicated by broken lines 12. Therefore, a cooling channel 10 of substantially identical cross section can be established effectively over the entire axial length of the stator 2 of the electric machine so as to ensure a sufficient ventilation of the air-gap winding 3 in the fastening apparatus 4 and the winding overhangs 11. As the base 15 defines a thermally closed cylinder surface 17 (FIG. 1) adjacent the air gap 5, the rotor 6 in particular is protected from heat introduction generated by the stator 2. This is especially desirous in connection with superconductive rotors. Suitably, as shown in FIG. 4, the cylinder surface 17 has a net-like structure. As a result, a certain cooling effect is established in the air gap 5 as additional axial and radial cooling channels are realized in and around the winding assembly. The cooling action of the net-like structure of the rotor-facing cylinder surface 17 can be further positively influenced through configuring the webs 8 in a particular and aligned manner. A variation of the net-like structure of the cylinder surface 17 is shown by way of example in FIG. 5.

The main body of the fastening apparatus 4 can be inserted as a complete unitary structure into the yoke 1. Suitably, the attachment of the fastening apparatus 4 is simplified by providing the webs 8 with a chamfer 14.

In order to further decrease the heat introduction into the rotor 6, in particular heat that is generated in the area of the winding overhangs 11, a cylindrical sleeve of electrically insulating material is attached at each of both axial ends of the main body in the area of the winding overhangs 11. The sleeves 13 may be attached to the main body through a material-based joint and/or frictional engagement connection and provide at a same time a support of the winding overhangs 11. Thus, the sleeves 13 can be used as installation aid.

FIG. 2 further shows the option to make the main body of the fastening apparatus in the form of segments 4" of different axial lengths. A combination of axial segments 4', 4" may also be possible. Basically, the segments 4', 4" can be joined together.

While the invention has been illustrated and described as embodied in an apparatus for securing a winding assembly, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An electric machine, comprising:
   stator yoke;
   a rotor spaced from the stator yoke at formation of an air gap therebetween;
   a winding assembly disposed at least partially in the air gap and having winding ends which form winding overhangs; and
   a fastening apparatus for securing the winding assembly, wherein the fastening apparatus includes a main body made of electrically insulating nonmagnetic material, said main body defined by an axis and including a cylindrical base and a plurality of webs extending in the direction of the axis and projecting radially outwards from the base in a direction of the stator yoke for at least partial engagement in complementary recesses in the stator yoke;
   wherein the stator yoke projects at least axially over the winding overhangs located at an end face of the electric machine.

2. The electric machine of claim 1, wherein each of the winding overhangs is wrapped by a bandage at least about a predetermined section thereof, and further comprising axial cooling channels extending between the bandage and the stator yoke.

3. The electric machine of claim 1, and further comprising axial cooling channels extending between the stator yoke and the winding assembly and having a cross sectional area extending substantially across the winding overhangs.

4. The use of a fastening apparatus according to claim 1 for a superconductive electric machine.

5. The use of claim 4 for synchronous generators.

6. The electric machine of claim 1, wherein the fastening apparatus is disposed at least partially in an air gap between the stator yoke and the rotor.

7. The electric machine of claim 1, wherein the webs have a comb-shaped configuration in the direction of the axis and include sections which are radially recessed for attachment of a bandage of the winding assembly.

8. The electric machine of claim 7, wherein the bandage has a thickness which corresponds to a height of the radially recessed sections of the webs.

9. The electric machine of claim 7, wherein the radially recessed sections of the webs as so configured as to allow an arrangement of the bandage in at least one of the wrappings selected from the group consisting of wrapping in circumferential direction and wrapping in helical configuration.

10. The electric machine of claim 1, wherein the main body has a single-piece configuration.

11. The electric machine of claim 1, wherein the main body includes different segments in at least one of axial direction and circumferential direction.

12. The electric machine of claim 11, wherein the segments have means for allowing interconnection of the segments.

13. The electric machine of claim 12, wherein the segments are interconnected by at least one of material-based joint and form-fitting engagement.

14. The electric machine of claim 1, wherein the winding assembly is secured in place by at least one of a bandage and a casting onto the main body.

15. The electric machine of claim 1, wherein the base of the main body has a closed cylinder surface in a direction toward the rotor.

16. An electric machine comprising:

a stator yoke:

a rotor spaced from the stator yoke at formation of an air gap therebetween;

a winding assembly disposed at least partially in the air gap and having winding ends which form winding overhangs; and a fastening apparatus for securing the winding assembly, wherein the fastening apparatus includes a main body made of electrically insulating non-magnetic material, said main body defined by an axis and including a cylindrical base and a plurality of webs extending in the direction of the axis and protecting radially outwards from the base in a direction of the stator yoke for at least partial engagement in complementary recesses in the stator yoke;

wherein the stator yoke projects at least axially over the winding overhangs located at an end face of the electric machine; and wherein the base of the main body has a cylinder surface in a direction toward the rotor, said cylinder surface having a net-like structure.

17. The electric machine of claim 16, wherein the cylinder surface of net-like structure is formed by the webs, as extending in axial and substantially in circumferential direction.

18. The electric machine of claim 16, wherein the net-like structure as defined by the webs has toothed members for securement at joint areas in the recesses of the stator yoke.

* * * * *